US009660557B2

(12) United States Patent
Shiraiwa et al.

(10) Patent No.: US 9,660,557 B2
(45) Date of Patent: May 23, 2017

(54) ELECTROSTATIC CHUCK AND METHOD FOR MANUFACTURING THE ELECTROSTATIC CHUCK (71) Applicant: SHINKO ELECTRIC INDUSTRIES CO., LTD., Nagano (JP)

(72) Inventors: Norio Shiraiwa, Nagano (JP); Jiro Kawai, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 117 days.

(21) Appl. No.: 13/890,566

(22) Filed: May 9, 2013

(65) Prior Publication Data
US 2013/0308244 A1 Nov. 21, 2013

(30) Foreign Application Priority Data

May 21, 2012 (JP) ................................ 2012-116035

(51) Int. Cl.
H01L 21/683 (2006.01)
H02N 13/00 (2006.01)

(52) U.S. Cl.
CPC ........ *H02N 13/00* (2013.01); *Y10T 29/49002* (2015.01)

(58) Field of Classification Search
CPC .................................................... H02N 13/00
USPC ........................................................ 361/234
See application file for complete search history.

(56) References Cited

U.S. PATENT DOCUMENTS

| 7,480,129 | B2* | 1/2009 | Brown et al. ................. 361/234 |
| 2006/0043065 | A1* | 3/2006 | Buchberger ........ H01L 21/6831 216/63 |
| 2009/0126871 | A1* | 5/2009 | Yamazawa ............... 156/345.29 |
| 2010/0156055 | A1 | 6/2010 | Saito et al. |
| 2011/0149462 | A1 | 6/2011 | Kugimoto et al. |
| 2014/0120732 | A1* | 5/2014 | Matsumoto et al. ......... 438/723 |

FOREIGN PATENT DOCUMENTS

| JP | 2006-344766 | * 12/2006 |
| JP | 2010-153490 | 7/2010 |
| JP | 2011-151336 | 8/2011 |

OTHER PUBLICATIONS

Office Action mailed on Mar. 29, 2016 issued with respect to the basic Japanese Patent Application No. 2012-116035.

* cited by examiner

Primary Examiner — Thienvu Tran
Assistant Examiner — Tien Mai
(74) Attorney, Agent, or Firm — IPUSA, PLLC (57) ABSTRACT An electrostatic chuck includes a pedestal part formed of metal and including a gas passage, an insulation substrate mounted on the pedestal part and including a first surface facing the pedestal part and a second surface on an opposite side of the first surface, the first surface including a first hole part communicating with the gas passage, the second surface including a second hole part having a bore diameter less than that of the first hole part and communicating with the first hole part, and an insulation flow part formed of an insulating material and including a first end provided in the first hole part and a second end provided in the gas passage. The insulation flow part is configured to allow a gas supplied from the gas passage to flow into the second hole part.

10 Claims, 9 Drawing Sheets

ELECTROSTATIC CHUCK AND METHOD FOR MANUFACTURING THE ELECTROSTATIC CHUCK

CROSS-REFERENCE TO RELATED APPLICATIONS

This application is based upon and claims the benefit of priority of the prior Japanese Patent Application No. 2012-116035 filed on May 21, 2012, the entire contents of which are incorporated herein by reference.

FIELD

The embodiments discussed herein are related to an electrostatic chuck and a method for manufacturing the electrostatic chuck.

BACKGROUND

A conventional electrostatic chuck includes an insulation substrate, an electrostatic electrode, and a base plate. The electrostatic chuck has a gas passage penetrating the insulation substrate, the electrostatic electrode, and the base plate in a thickness direction of the insulation substrate, the electrostatic electrode, and the base plate, respectively (see, for example, FIG. 2 of Japanese Laid-Open Patent Publication No. 2010-153490).

In a state where, for example, a wafer is placed on the insulation substrate of the conventional electrostatic chuck, an abnormal discharge may occur in the gas passage when generating plasma on a surface of the wafer by supplying high frequency electric power to the base plate formed of metal.

This abnormal discharge is due to the exposure of the inner wall of the gas passage of the base plate.

SUMMARY

According to an aspect of the invention, there is provided an electrostatic chuck including a pedestal part formed of metal and including a gas passage, an insulation substrate mounted on the pedestal part and including a first surface facing the pedestal part and a second surface on an opposite side of the first surface, the first surface including a first hole part communicating with the gas passage, the second surface including a second hole part having a bore diameter less than that of the first hole part and communicating with the first hole part, and an insulation flow part formed of an insulating material and including a first end provided in the first hole part and a second end provided in the gas passage, wherein the insulation flow part is configured to allow a gas supplied from the gas passage to flow into the second hole part.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

DESCRIPTION OF EMBODIMENTS

Before describing illustrative embodiments of the present invention, connection structural bodies and electronic devices according to the following comparative examples 1 and 2 are described.

COMPARATIVE EXAMPLE 1

Figure 1:
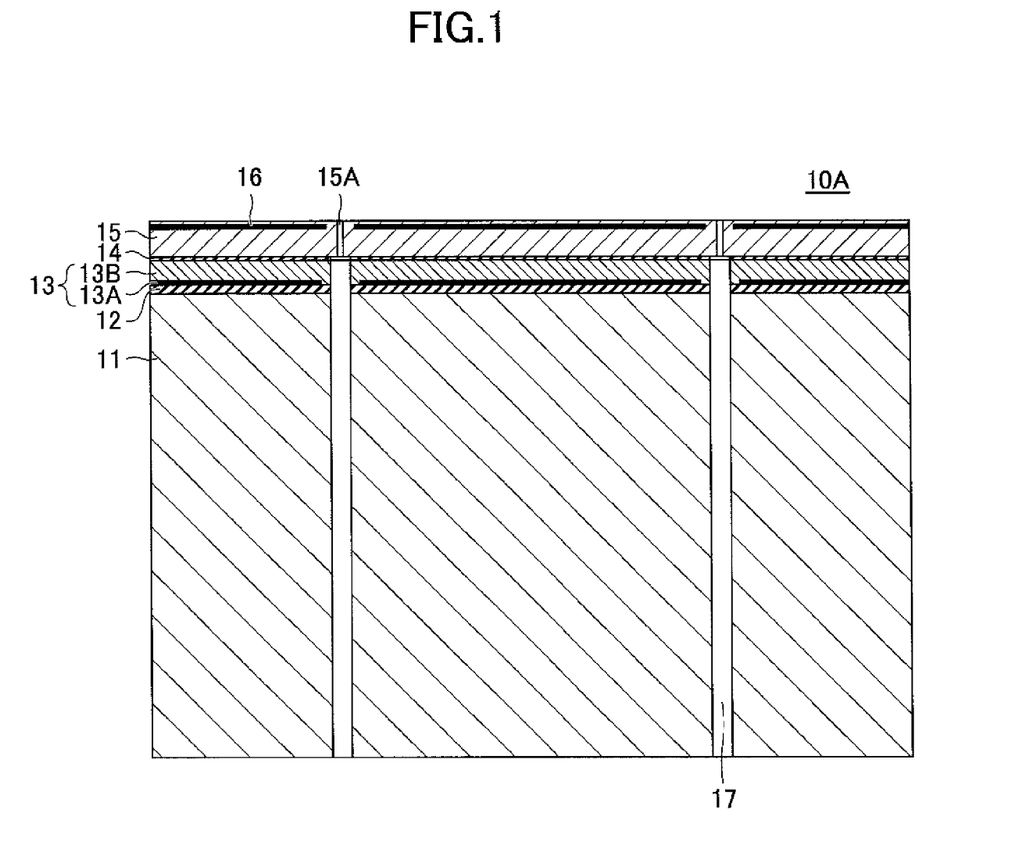
FIG. 1 is a schematic diagram illustrating a cross-section of a structure of an electrostatic chuck according to comparative example 1.

FIG. 1 is a schematic diagram illustrating a cross-section of a structure of an electrostatic chuck 10A according to comparative example 1.

The electrostatic chuck 10A of the comparative example includes a base plate 11, a silicone resin layer 12, a heater plate 13, a silicone resin layer 14, a ceramic substrate 15, and an electrode 16.

The base plate 11 serves as a part of the base of the electrostatic chuck 10A. For example, the base plate 11 may have a plate-like shape and be made of aluminum (Al). A gas passage 17 having a straight linear shape is formed in the base plate 11. The base plate 11 and the below-described heater plate 13 constitute a susceptor.

The silicone resin layer 12 is provided for adhering the base plate 11 and the heater plate 13 together. The silicone resin layer 12 is formed by applying a silicone resin on an upper surface of the base plate 11. The silicone resin may be applied by using, for example, a screen printing method.

The heater plate 13 includes a heater 13A and an aluminum plate 13B. The heater 13A is an electrically heated wire that is covered by a resin film. The heater 13A is adhered to one side of the aluminum plate 13B.

The aluminum plate 13B is a metal plate for securing the heater 13A. The gas passage 17 is formed in a portion of the aluminum plate 13B in which the heater 13A is not formed. The gas passage 17 in the aluminum plate 13B has a straight linear shape and continues from the base plate 11.

The heater plate 13 is provided for managing the temperature of a wafer placed on the upper surface of the ceramic substrate 15. As described above, the heater plate 13 and the base plate 11 constitute a susceptor.

The silicone resin layer 14 is provided for adhering the heater plate 13 and the ceramic substrate 15 together. The silicone resin layer 14 is formed by applying a silicone resin on an upper surface of the heater plate 13. The silicone resin may be applied by using, for example, a screen printing method.

The ceramic substrate 15 has the electrode 16 formed therein. The ceramic substrate 15 is a substrate having an upper surface on which a wafer (not illustrated) is to be placed. A gas hole 15A is formed in a portion of the ceramic substrate 15 in which the electrode 16 is not formed. The gas hole 15A continues from the gas passage 17 formed in the base plate 11.

The electrode 16 is a high melting point electrode installed inside the ceramic substrate 15. The electrode 16 generates an electrostatic force (Coulomb's force or Johnsen-Rahbeck force) that attracts a wafer placed on the upper surface of the ceramic substrate 15 when voltage from an external power source is applied to the electrode 16.

The gas passage 17 is a passage penetrating the base plate 11 and the heater plate 13 in a straight linear manner. The gas passage 17 is connected to the gas hole 15A of the ceramic substrate 15. A cooling gas is supplied from a gas supply device (not illustrated) to the gas passage 17 and is ejected from the gas hole 15A of the ceramic substrate 15. The cooling gas may be, for example, an inert gas such as helium.

In a case of using the electrostatic chuck 10A for performing a dry-etching process on a semiconductor, a wafer placed on the upper surface of the ceramic substrate 15 is easily heated by plasma. Thereby, the temperature of the wafer is increased. The increased temperature of the wafer may thermally damage the photoresist of a mask used for the etching and degrade the shape of the etched object. In order to prevent such difficulties from occurring, the wafer is to be cooled to a predetermined temperature during the etching process.

In order to manage the temperature of the wafer, the electrostatic chuck 10A may cool the wafer by allowing inert gas (e.g., helium) to flow between the wafer and the ceramic substrate 15 or provide a cooling channel or the heater 13A in the susceptor, so that the wafer can maintain a uniform temperature.

In addition to supplying a cooling gas to the wafer by way of the gas passage 17 and the gas hole 15A, the electrostatic chuck 10A supplies high frequency electric power to the base plate 11 in a state where the wafer is placed on the upper surface of the ceramic substrate 15.

In this state, abnormal discharge such as arc discharge may occur in the electrostatic chuck 10A of the comparative example 1 due to the exposed inner wall surface of the gas passage 17 in the aluminum plate 13B of the heater plate 13 and the base plate 11.

When such abnormal discharge occurs, holes may be formed on the surface of the ceramic substrate 15 of the electrostatic chuck 10A or the surface of the ceramic substrate 15 of the electrostatic chuck 10A may be scorched. Thus, the electrostatic chuck 10A may be damaged.

Furthermore, the wafer may be damaged during a semiconductor manufacturing process and degrade the yield of a semiconductor device in the case where the abnormal discharge occurs.

Figure 2:
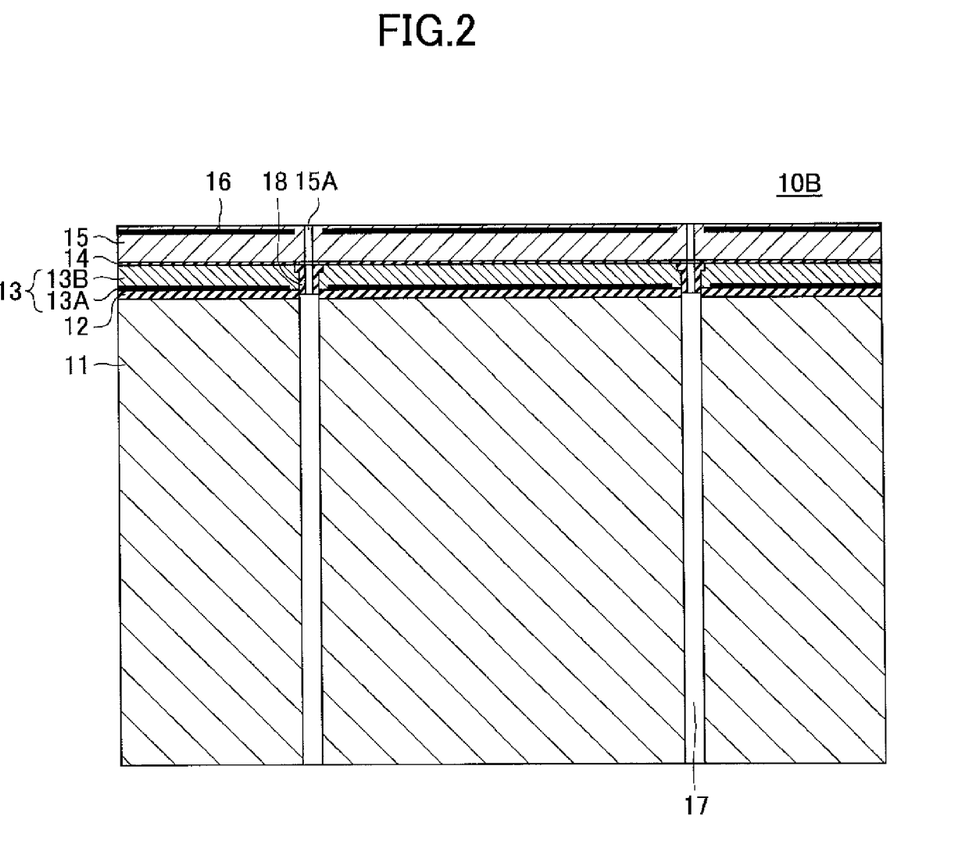
FIG. 2 is a schematic diagram illustrating a cross-section of a structure of an electrostatic chuck according to comparative example 2.

Next, an electrostatic chuck 10B according to comparative example 2 is described.

FIG. 2 is a schematic diagram illustrating a cross-section of a structure of an electrostatic chuck 10B according to comparative example 2.

The electrostatic chuck 10B of the comparative example 2 has an insulation part 18 added to the electrostatic chuck 10A of the comparative example 1. Other than having the insulation part 18 added, the electrostatic chuck 10B of the comparative example 2 has substantially the same configuration as the electrostatic chuck 10A of the comparative example 1.

The insulation part 18 is a tubular insulating member provided inside the gas passage 17 of the heater plate 13. The insulation part 18 is provided in the gas passage 17, so that an upper end of the insulation part 18 is positioned at the same height as the upper surface of the heater plate 13 whereas a lower end of the insulation part 18 is positioned at the same height as the lower surface of the heater plate 13 or at a height that is substantially halfway through the silicone resin layer 12 (position between the upper and lower surfaces of the silicone resin layer 12) in a thickness direction of the silicone resin layer 12.

The insulation part 18 is provided inside the gas passage 17 of the heater plate 13 to prevent abnormal discharge from occurring at the inner wall of the aluminum plate 13B of the heater plate 13.

However, even in a case where the insulation part 18 is provided inside the gas passage 17, abnormal discharge may occur. For example, if there are voids in the silicone resin layer 14 toward the upper side of the heater plate 13, the silicone resin layer 14 cannot provide sufficient insulation at portions corresponding to the voids even in a case where the insulation part 18 is provided inside the gas passage 17. As a result, abnormal discharge may occur due to high frequency voltage applied to the inner wall of the aluminum plate 13B.

Similarly, if there are voids in the silicone resin layer 12 toward the lower side of the heater plate 13, the silicone resin layer 12 cannot provide sufficient insulation at portions corresponding to the voids. As a result, abnormal discharge may occur due to high frequency voltage applied to the inner wall of the aluminum plate 13B.

Although the inner wall of the gas passage 17 in the heater plate 13 is covered by the insulation part 18, the inner wall of the gas passage 17 in the base plate 11 is not covered by the insulation part 18. Therefore, in a case where the voltage level of the high frequency voltage is high, abnormal discharge may occur at the inner wall of the gas passage 17 in the base plate 11.

Therefore, according to the above-described electrostatic chucks 10A, 10B of comparative examples 1 and 2, abnormal discharge may occur in the gas passage 17.

In view of the above, the below-described first-third embodiments of the present invention provide an electrostatic chuck and a method for manufacturing the electrostatic chuck to solve the above-described problems such as abnormal discharge.

<First Embodiment>

Figure 3:
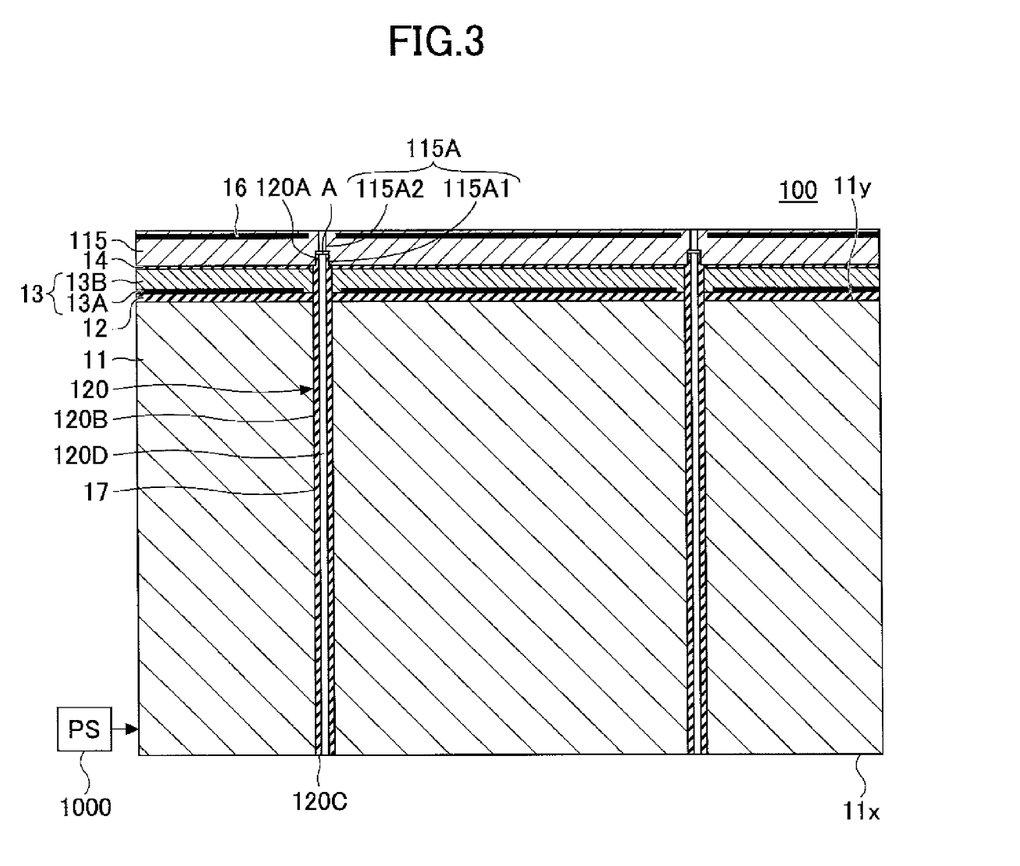
FIG. 3 is a schematic diagram illustrating a cross-section of a structure of an electrostatic chuck according to a first embodiment of the present invention.

FIG. 3 is a schematic diagram illustrating a cross-section of a structure of an electrostatic chuck 100 according to a first embodiment of the present invention.

The electrostatic chuck 100 of the first embodiment includes a base plate 11, a silicone resin layer 12, a heater plate 13, a silicone resin layer 14, a ceramic substrate 115, an electrode 16, and an insulation sleeve 120. A gas passage 17 is formed in the base plate 11 and the heater plate 13.

Among the components/parts constituting the electrostatic chuck 100, the base plate 11, the silicone resin layer 12, the heater plate 13, the silicone resin layer 14, and the electrode 16 are denoted with like reference numerals as those of the electrostatic chuck 10A, 10B of the comparative examples 1 and 2. The base plate 11 is an example of a pedestal part.

The ceramic substrate 115 has the electrode 16 formed therein. The ceramic substrate 115 has an upper surface on which a wafer (not illustrated) is to be placed. The ceramic substrate 115 is an example of an insulation substrate.

Hole parts 115A1 and 115A2 are formed in the ceramic substrate 115. The hole parts 115A1, 115A2 constitute a gas hole 115A that is formed as a through-hole of the ceramic substrate 115.

The hole part 115A1 is formed from one surface (lower surface) of the ceramic substrate 115 toward the heater plate 13. The hole part 115A1 is an example of a first hole part that communicates with the gas passage 17 in the heater plate 13. The hole part 115A1 has an opening (bore diameter) that is larger than that of the hole part 115A2. An upper end 120A of an insulation sleeve 120 is inserted into the hole part 115A1. The hole part 115A1 is a counterbore for installing the upper end 120A of the sleeve 120.

The hole part 115A2 has an opening (bore diameter) that is smaller than that of the hole part 115A1. The hole part 115A2 is an example of a second hole part 115A2 formed extending from the hole part 115A to the other surface (upper surface) of the ceramic substrate 115.

Although the openings of the hole parts 115A1, 115A2 have circular shapes, the openings of the hole parts 115A1, 115A2 may have different shapes. For example, the shapes of the openings of the hole parts 115A1, 115A2 may be elliptical shapes, polygonal shapes (e.g., triangle, quadrangle), etc.

The insulation sleeve 120 is a tubular insulating member. The insulation sleeve 120 includes the upper end 120A, a main body 120B, and a lower end 120C. The insulation sleeve 120 is an example of an insulation flow part. The insulation sleeve 120 has a through hole 120D penetrating the insulation sleeve 120 from the upper end 120A to the lower end 1200. The through hole 120D communicates with the hole part 115A2 in a state where the upper end 120A is installed in the hale part 115A1.

A gap A is provided inside the hole part 115A1 toward an upper side of the upper end 120A. The gap A is provided, so that a length (depth) of the hole part 115A1 in a vertical direction of the hole part 115A1 is greater than a length of the upper end 120A in a longitudinal direction of the upper end 120A. Thereby, the gap A can absorb a tolerance of the length of the insulation sleeve 120.

The gap A is also for preventing the upper end 120A from contacting an upper surface of the hale part 115A1 (i.e. a circle-shaped annular surface of the hole part 115A1 formed by the difference of bore diameter of the hole part 115A1 and the bore diameter of the hole part 115A2).

The upper end 120A is inserted to the hole part 115A1 of the ceramic substrate 115. The main body 120B is provided inside the gas passage 17 formed in the base plate 11 and the heater plate 13. Further, the lower end 120C is positioned at the same height as the lower end of the gas passage 17 (lower surface of the base plate 11).

Hence, the electrostatic chuck 100 of the first embodiment is configured having the hole part 115A1 (counterbore) provided in the ceramic substrate 115 and the upper end 120A of the insulation sleeve 120 inserted to the hole part 115A1. Further, the insulation sleeve 120 is provided inside the gas passage 17 formed in the base plate 11 and the heater plate 13, and the lower end 120C of the insulation sleeve 120 is positioned at the same height as the lower end 11x of the base plate 11. The lower end 120C is an inlet of the gas passage 17 that allows a cooling gas from a gas supply source (not illustrated) to flow into the gas passage 17.

In other words, the inner wall of the gas passage 17 in the heater plate 13 and the inner wall of the gas passage 17 in the base plate 11 are covered by the insulation sleeve 120.

Accordingly, in a state where electric power of high frequency (high frequency power) is supplied from a high frequency power source 1000 (see FIG. 3) to the base plate 11, even if a cooling gas is supplied to a wafer placed on the ceramic substrate 15, abnormal discharge can be prevented from occurring inside the gas passage by way of the through-hole 120D of the insulation sleeve 120 and the hole part 115A2.

Next, a configuration of the hole part 115A2 from a plan view is described with reference to FIGS. 4A-4D.

Figure 4A:
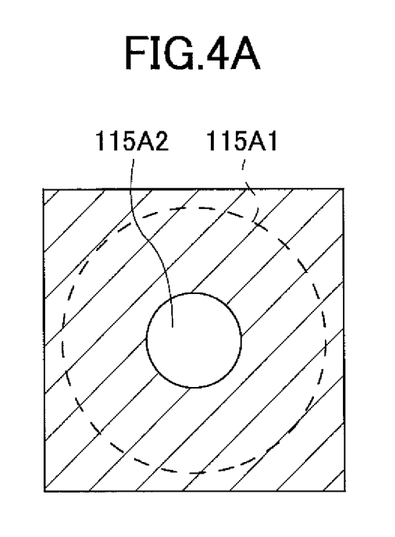
FIGS. 4A-4D illustrate configurations of a hole part of an electrostatic chuck of the first embodiment from a plan view, respectively.
Figure 4B:
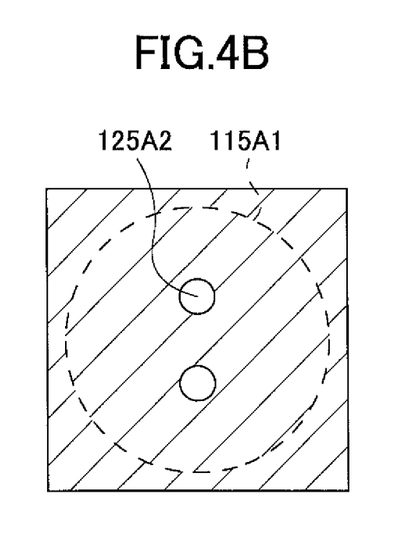
Figure 4C:
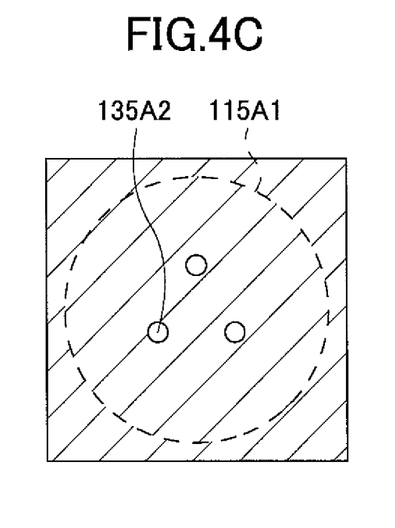
Figure 4D:
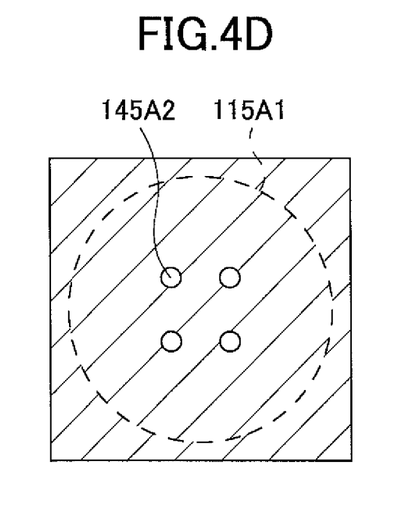

FIGS. 4A-4D illustrate configurations of the hole part 115A2 of the electrostatic chuck 100 of the first embodiment from a plan view, respectively. FIG. 4A is a plan view corresponding to FIG. 3. FIGS. 4B-4D are modified examples of the configuration of FIG. 4A.

FIG. 4A is a plan view of the hole part 115A2 formed in the ceramic substrate 115. The circle illustrated with broken lines in FIG. 4A represents the contour of the hole part 115A1. Both the hole part 115A1 and the hole part 115A2 have circular shapes and are concentrically arranged with each other.

FIG. 4B illustrates a modified example having two of the hole parts 125A2 formed in the ceramic substrate 115 with respect to the single hole part 115A1. In this modified example, the cooling gas is ejected from the single hole part 115A1 via the two hole parts 125A2. The two hole parts 125A2 are positioned to establish a point of symmetry with respect to the center of the hole part 115A1.

FIG. 4C illustrates another modified example having three of the hole parts 135A2 formed in the ceramic substrate 115 with respect to the single hole part 115A1. In this modified example, the cooling gas is ejected from the single hole part 115A1 via the three hole parts 135A2. The three hole parts 135A2 are positioned to establish a point of symmetry with respect to the center of the hole part 115A1.

FIG. 4D illustrates yet another modified example having four of the hole parts 145A2 formed in the ceramic substrate 115 with respect to the single hole part 115A1. In this modified example, the cooling gas is ejected from the single hole part 115A1 via the four hole parts 145A2. The four hole parts 145A2 are positioned to establish a point of symmetry with respect to the center of the hole part 115A1.

Next, a method for manufacturing the electrostatic chuck 100 according to the first embodiment of the present invention is described with reference to FIGS. 5A-5C.

Figure 5A:
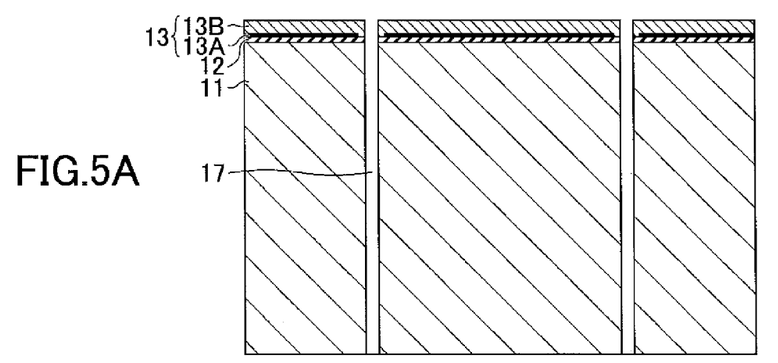
FIGS. 5A-5C are schematic diagrams illustrating a method for manufacturing an electrostatic chuck according to the first embodiment of the present invention.
Figure 5B:
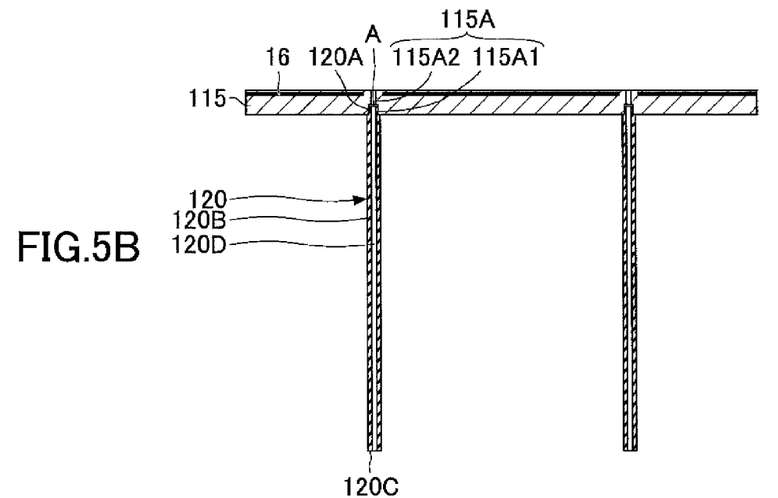
Figure 5C:
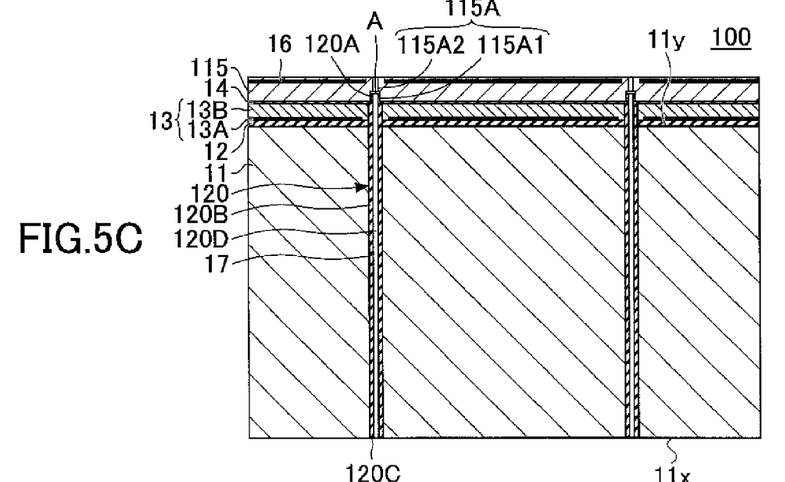

FIGS. 5A-5C are schematic diagrams illustrating a method for manufacturing the electrostatic chuck 100 according to the first embodiment of the present invention.

As illustrated in FIG. 5A, the base plate 11 and the heater plate 13 are adhered to each other by way of the silicone resin layer 12. The gas passage 17 is formed in each of the base plate 11 and the heater plate 13 beforehand.

Then, as illustrated in FIG. 5B, the ceramic substrate 115 including the hole parts 115A1, 115A2 and the insulation sleeve 120 are prepared. Then, an end (in this embodiment, upper end) 120A of the insulation sleeve 120 is adhered to the hole part 115A2. For example, the upper end 120A may be adhered to the hole part 115A2 by applying an epoxy resin to the upper end 120A or the hole part 115A2.

Then, the silicone resin layer 12 is formed on the upper surface of the base plate 11 of FIG. 5A by applying a silicone resin on the upper surface of the base plate 11. Then, the main body 120B of the insulation sleeve 120 of FIG. 5B is inserted into the gas passage 17. Then, by adhering the upper surface of the heater plate 13 and the lower surface of the ceramic substrate 115 by way of the silicone resin layer 14, the manufacturing of the electrostatic chuck 100 is completed as illustrated in FIG. 5C.

Hence, with the above-described electrostatic chuck 100 of the first embodiment, the upper end 120A of the insulation sleeve 120 is inserted to the hole part 115A1 of the ceramic substrate 115. Further, the inner wall of the gas passage 17 in the heater plate 13 and the inner wall of the gas passage 17 in the base plate 11 are covered by the insulation sleeve 120.

Accordingly, in a state where high frequency power from the high frequency power source 1000 is supplied to the base plate 11, even if a cooling gas is supplied to a wafer placed on the ceramic substrate 115, abnormal discharge can be prevented from occurring inside the gas passage 17 by way of the through-hole 120D of the insulation sleeve 120 and the hole part 115A2.

Such abnormal discharge can be prevented by improving the insulation property between the ceramic substrate 15 and the heater plate 13 by inserting the upper end 120A of the insulation sleeve 120 to the hole part 115A1 of the ceramic substrate 115 and covering the inner walls of the heater plate 13 and the base plate 11 with the insulation sleeve 120.

In the above-described first embodiment, the insulation sleeve 120 covers the entire inner walls of the heater plate 13 and the base plate 11. However, the insulation sleeve 120 does not necessarily need to cover the inner walls of the heater plate 13 and the base plate 11 in a manner such that the lower end 120C of the insulation sleeve 120 reaches the lower end 11x of the base plate 11.

In other words, the lower end 120C of the insulation sleeve 120 may be positioned lower than the upper end 11y of the base plate 11 but higher than the lower end 11x of the base plate 11.

In the above-described first embodiment, the heater plate 13 is included in the electrostatic chuck 100. However, in an alternative case, the electrostatic chuck 100 may be formed without the heater plate 13. In this alternative case where the heater plate 13 is not included in the electrostatic chuck 100, the ceramic substrate 115 is mounted on the base plate 11 interposed by the silicone resin layer 12.

Further, in this alternative case, the lower end 120C of the insulation sleeve 120 is positioned at the same height as the lower end 11x of the base plate 11. That is, the entire inner wall of the base plate 11 inside the gas passage 17 is covered by the insulation sleeve 120.

It is, however, to be noted that the insulation sleeve 120 does not necessarily need to cover the inner wall of the base plate 11 in a manner that the lower end 120C of the insulation sleeve 120 reaches the lower end 11x of the base plate 11. That is, the lower end 120C of the insulation sleeve 120 may be positioned lower than the upper end 11y of the base plate 11 but higher than the lower end 11x of the base plate 11.

<Second Embodiment>

Figure 6:
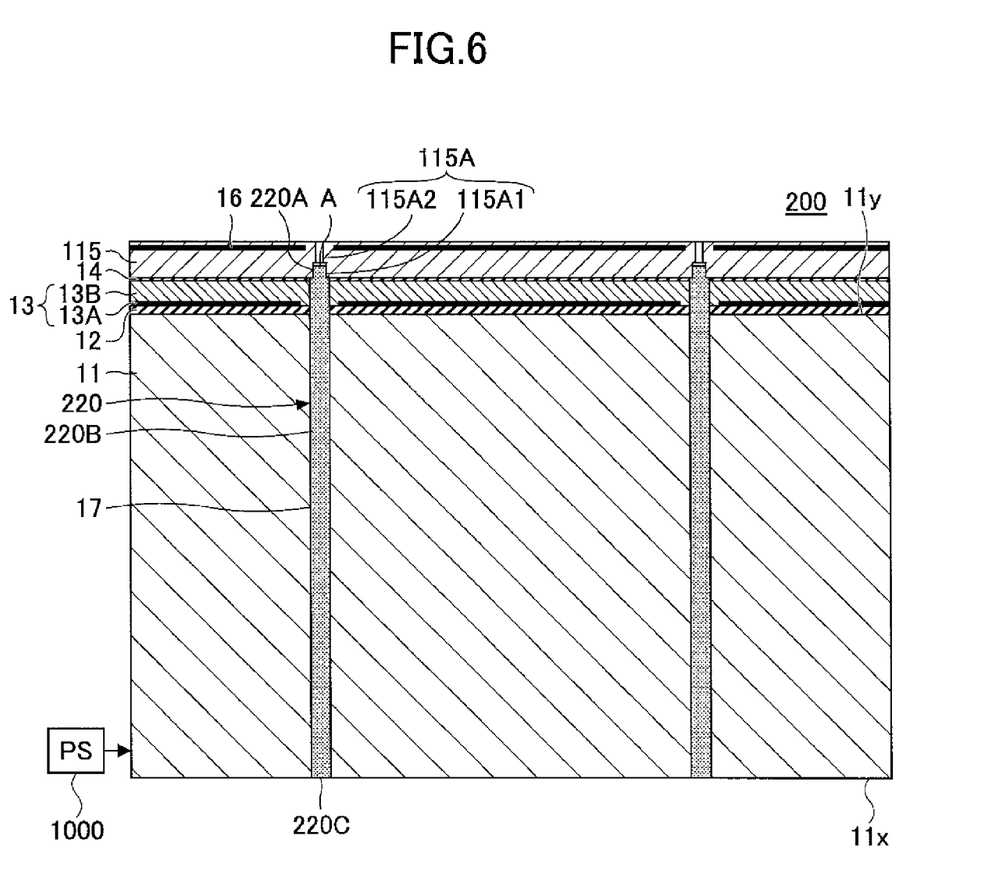
FIG. 6 is a schematic diagram illustrating a cross-section of a structure of an electrostatic chuck according to a second embodiment of the present invention.

FIG. 6 is a schematic diagram illustrating a cross-section of a structure of an electrostatic chuck 200 according to a second embodiment of the present invention.

The electrostatic chuck 200 of the second embodiment includes an insulation sleeve 220 that replaces the insulation sleeve 120 of the electrostatic chuck 100 of the first embodiment. Other than the insulation sleeve 220, the components/parts constituting the electrostatic chuck 200 are substantially the same as the components/parts constituting the electrostatic chuck 100. Thus, like components/parts of the electrostatic chuck 200 are denoted with like reference numerals as those of the electrostatic chuck 100 and are not further explained.

The insulation sleeve 220 is a porous columnar member formed of an insulating material.

The insulation sleeve 220 includes an upper end 220A, a main body 220B, and a lower end 220C. Because the insulation sleeve 220 is porous and gas-permeable, the gas passage 17 is in gas communication with the hole part 115A2 when the upper end 220A is installed in the hole part 115A1.

Although the insulation sleeve 220 of the second embodiment is provided in the entire gas passage 17 formed in the base plate 11 and the heater plate 13, a cooling gas can flow from the lower end of the gas passage 17 to the upper end of the gas passage 17 because the insulation sleeve 220 is formed of a porous insulating member. The porous insulating member used for the insulation sleeve 220 has a gas-permeability that is substantially equivalent to the insulation sleeve 120 including the through-hole 120D of the first embodiment.

A gap A is provided inside the hole part 115A1 toward an upper side of the upper end 220A. The gap A is provided, so that a length (depth) of the hole part 115A1 in a vertical direction of the hole part 115A1 is greater than a length of the upper end 220A in a longitudinal direction of the upper end 220A. Thereby, the gap A can prevent the upper end 220A from contacting the upper surface of the hole part 115A1 (i.e. a circle-shaped annular surface of the hole part 115A1 formed by the difference of bore diameter of the hole part 115A1 and the bore diameter of the hole part 115A2).

The upper end 220A is inserted into the hole part 115A1 of the ceramic substrate 115. The main body 220B is provided inside the gas passage 17 formed in the base plate 11 and the heater plate 13. Further, the lower end 220C is positioned at the same height as the lower end of the gas passage 17 (lower surface of the base plate 11).

Hence, the electrostatic chuck 200 of the second embodiment is configured having the hole part 115A1 (counterbore) provided in the ceramic substrate 115 and the upper end 220A of the insulation sleeve 220 inserted to the hole part 115A1. Further, the insulation sleeve 220 is provided inside the gas passage 17 formed in the base plate 11 and the heater plate 13, and the lower end 220C of the insulation sleeve 220 is positioned at the same height as the lower end 11x of the base plate 11.

In other words, the inner wall of the gas passage 17 in the heater plate 13 and the inner wall of the gas passage 17 in the base plate 11 are covered by the insulation sleeve 220.

Accordingly, in a state where high frequency power is supplied from the high frequency power source 1000 (see FIG. 6) to the base plate 11, even if a cooling gas is supplied to a wafer placed on the ceramic substrate 15, abnormal discharge can be prevented from occurring inside the gas passage 17 by way of the insulation sleeve 220 and the hole part 115A2.

Next, a method for manufacturing the electrostatic chuck 200 according to the second embodiment of the present invention is described with reference to FIGS. 7A-7C.

Figure 7A:
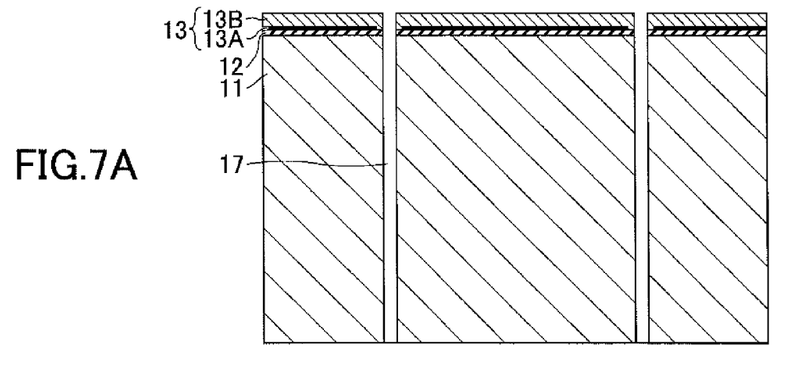
FIGS. 7A-7C are schematic diagrams illustrating a method for manufacturing an electrostatic chuck according to the second embodiment of the present invention.
Figure 7B:
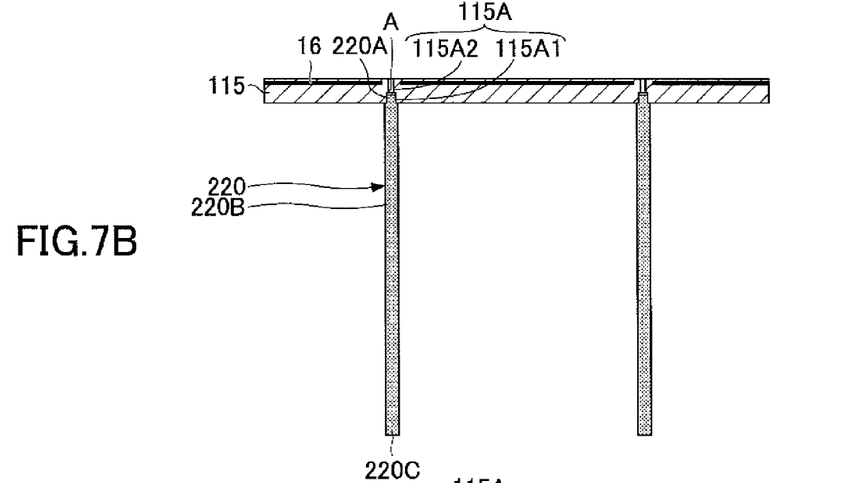
Figure 7C:
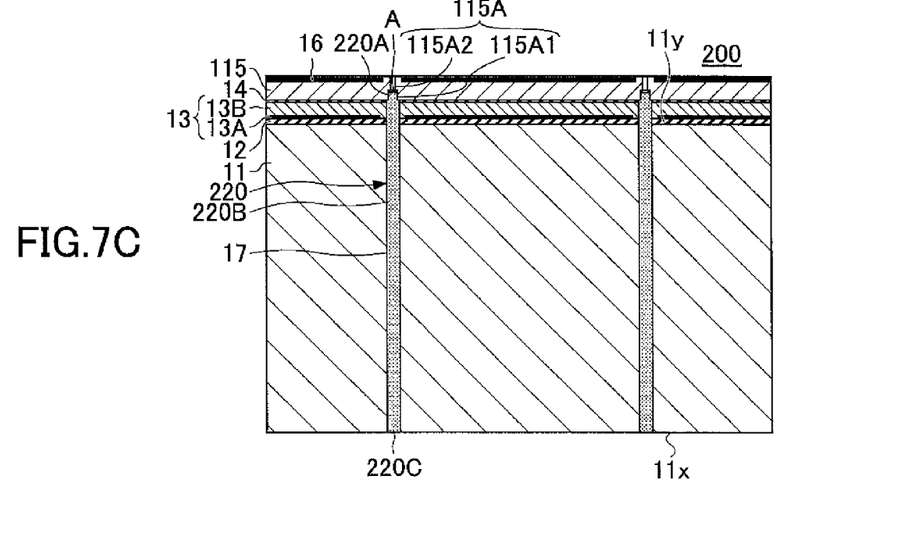

FIGS. 7A-7C are schematic diagrams illustrating a method for manufacturing the electrostatic chuck 200 according to the second embodiment of the present invention.

As illustrated in FIG. 7A, the base plate 11 and the heater plate 13 are adhered to each other by way of the silicone resin layer 12. The gas passage 17 is formed in each of the base plate 11 and the heater plate 13 beforehand.

Then, as illustrated in FIG. 7B, the ceramic substrate 115 including the hole parts 115A1, 115A2 and the insulation sleeve 220 are prepared. Then, an end (in this embodiment, upper end) 220A of the insulation sleeve 220 is adhered to the hole part 115A2. For example, the upper end 220A may be adhered to the hole part 115A2 by applying an epoxy resin to the upper end 220A or the hole part 115A2.

Then, the silicone resin layer 14 is formed on the upper surface of the heater plate 13 of FIG. 7A by applying a silicone resin on the upper surface of the heater plate 13. Then, the main body 220B of the insulation sleeve 220 of FIG. 7B is inserted into the gas passage 17. Then, by adhering the upper surface of the heater plate 13 and the lower surface of the ceramic substrate 115 by way of the silicone resin layer 14, the manufacturing of the electrostatic chuck 200 is completed as illustrated in FIG. 7C.

Hence, with the above-described electrostatic chuck 200 of the second embodiment, the upper end 220A of the insulation sleeve 220 is inserted into the hole part 115A1 of the ceramic substrate 115. Further, the inner wall of the gas passage 17 in the heater plate 13 and the inner wall of the gas passage 17 are covered by the insulation sleeve 220.

Accordingly, in a state where high frequency power is supplied from the high frequency power source 1000 to the base plate 11, even if a cooling gas is supplied to a wafer placed on the ceramic substrate 115, abnormal discharge can be prevented from occurring inside the gas passage 17 by way of the insulation sleeve 220 and the hole part 115A2.

Such abnormal discharge can be prevented by improving the insulation property between the ceramic substrate 15 and the heater plate 13 by inserting the upper end 220A of the insulation sleeve 220 into the hole part 115A1 of the ceramic substrate 115 and covering the inner walls of the heater plate 13 and the base plate 11 with the insulation sleeve 220.

In the above-described second embodiment, the insulation sleeve 220 covers the entire inner walls of the heater plate 13 and the base plate 11. However, the insulation sleeve 220 does not necessarily need to cover the inner walls of the heater plate 13 and the base plate 11 in a manner such that the lower end 220C of the insulation sleeve 220 reaches the lower end 11x of the base plate 11.

In other words, the lower end 220C of the insulation sleeve 220 may be positioned lower than the upper end 11y of the base plate 11 but higher than the lower end 11x of the base plate 11.

In the above-described second embodiment, the heater plate 13 is included in the electrostatic chuck 200. However, in an alternative case, the electrostatic chuck 200 may be formed without the heater plate 13. In this alternative case where the heater plate 13 is not included in the electrostatic chuck 100, the ceramic substrate 115 is mounted on the base plate 11 interposed by the silicone resin layer 12.

Further, in this alternative case, the lower end 220C of the insulation sleeve 220 is positioned at the same height as the lower end 11x of the base plate 11. That is, the entire inner wall of the base plate 11 inside the gas passage 17 is covered by the insulation sleeve 220.

It is, however, to be noted that the insulation sleeve 220 does not necessarily need to cover the inner wall of the base plate 11 in a manner that the lower end 220C of the insulation sleeve 220 reaches the lower end 11x of the base plate 11. That is, the lower end 220C of the insulation sleeve 220 may be positioned lower than the upper end fly of the base plate 11 but higher than the lower end 11x of the base plate 11.

<Third Embodiment>

Figure 8:
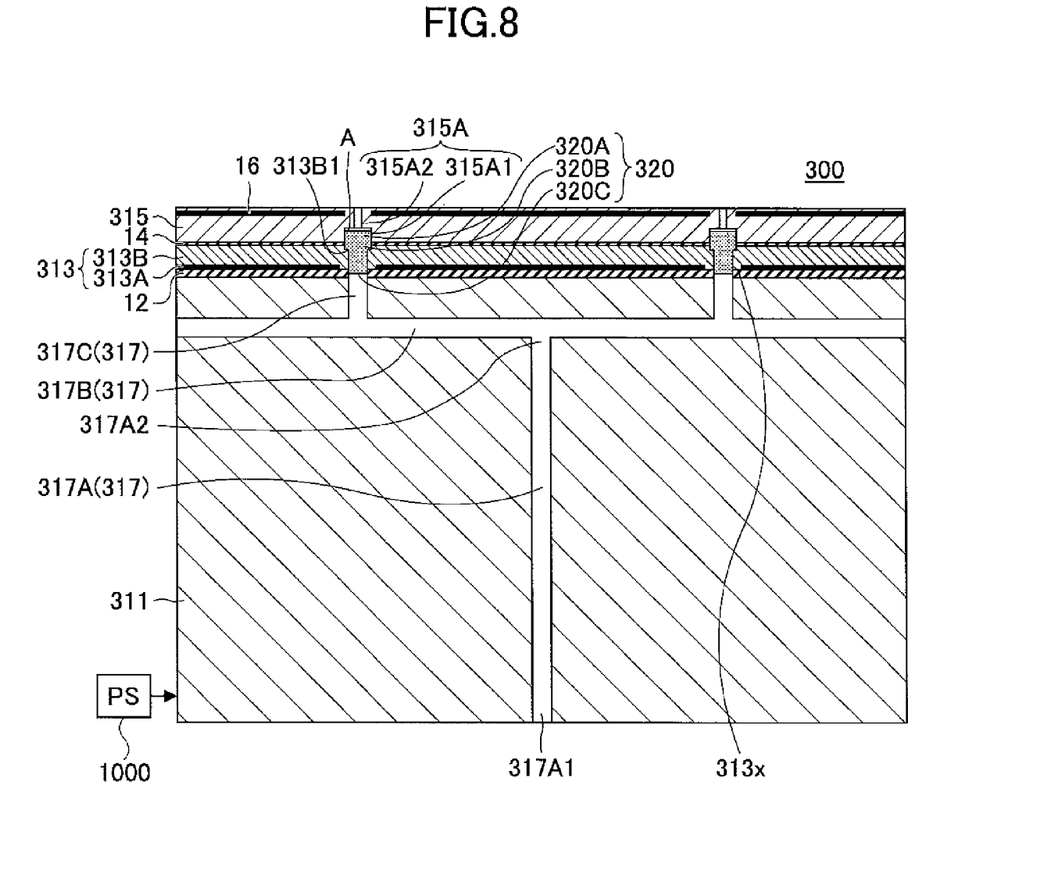
FIG. 8 is a schematic diagram illustrating a cross-section of a structure of an electrostatic chuck according to a third embodiment of the present invention.

FIG. 8 is a schematic diagram illustrating a cross-section of a structure of an electrostatic chuck 300 according to the third embodiment of the present invention.

The electrostatic chuck 300 of the third embodiment includes a base plate 311, a heater plate 313, a ceramic substrate 315, and an insulation sleeve 320 that replace the base plate 11, the heater plate 13, the ceramic substrate 15, and the insulation sleeve 220, respectively.

The base plate 311 includes a branching type gas passage 317 that replaces the linear gas passage 17 of the base plate 11 of the second embodiment. Further, due to the change of the shape of the gas passage 317 in relation with the gas passage 17, the shape of the insulation sleeve 320 is also different from the shape of the insulation sleeve 220 of the second embodiment. Further, due to the change of the shape of the insulation sleeve 320 in relation with the insulation sleeve 220, the shape of the heater plate 313 is also different from the shape of the heater plate 13.

Accordingly, other than the base plate 311, the heater plate 313, the gas passage 317, and the insulation sleeve 320, the components/parts constituting the electrostatic chuck 300 are substantially the same as the components/parts constituting the electrostatic chuck 200 of the second embodiment. Thus, like components/parts of the electrostatic chuck 300 are denoted with like reference numerals as those of the electrostatic chuck 200 and are not further explained.

The branching type gas passage 317 is formed in the base plate 311. The gas passage 317 includes gas passage parts 317A, 317B, and 317C. The gas passage part 317A has a lower end 317A1 positioned at the lower end of the base plate 311. The gas passage part 317A has a linear shape between the lower end 317A1 and an upper end 317A2 of the gas passage part 317A. The gas passage part 317A is connected to the gas passage part 317B extending in a horizontal direction of the base plate 311. The gas passage 317A and the gas passage 317B are connected at the upper end 317A2 of the gas passage 317A. The gas passage part 317B is connected to the gas passage part 317C extending toward the upper end of the base plate 311.

Thereby, the gas passage 317 has the gas passage 317A branching into the gas passage 317B and has the gas passage 317B further branching into the gas passage 317C. Although FIG. 8 illustrates the gas passage 317 having two branches constituting the gas passage part 317C, the actual gas passage 317 has more branches constituting the gas passage part 317C. Therefore, the gas passage 317B extends more outward than the two branches of the gas passage part 317C.

The heater plate 313 includes an aluminum plate 313B having a shape different from the shape of the aluminum plate 13B of the second embodiment. A step part 313B1 is formed in the gas passage 317 of the aluminum plate 313B. The opening (bore diameter) of a portion of the gas passage 317 above the step part 313B1 is larger compared to the opening (bore diameter) of a portion the gas passage below the step part 313B1. A step part 320B of the insulation sleeve 320 is installed in the step part 313B1. The step part 313B1 may be formed by forming a counterbore in the gas passage 317.

A hole part 315A1 and a hole part 315A2 are formed in the ceramic substrate 315. The hole parts 315A1, 315A2 constitute a gas hole 315A that is formed as a through-hole of the ceramic substrate 315. The hole part 315A1 has an opening (bore diameter) that is larger than the opening (bore diameter) of the hole part 115A1 of the ceramic substrate 115 of the second embodiment. The opening (bore diameter) of the hole part 315A1 is substantially the same size as the opening (bore diameter) of a portion of the gas passage 317 above the step part 313B1 of the aluminum plate 313B of the heater plate 313.

The insulation sleeve 320 is a porous columnar member formed of an insulating material. The insulation sleeve 320 includes an upper end 320A, the step part 320B, and a lower end 320C. The insulation sleeve 320 of the third embodiment is shorter than the insulation sleeve 220 of the second embodiment. The insulation sleeve 320 of the third embodiment is formed shorter than the insulation sleeve 220 of the second embodiment to match the shape of the branching type gas passage 317 instead of the linear gas passage (see, for example, FIG. 6) of the second embodiment.

Further, the portion of the insulation sleeve 320 above the step part 320B (toward the upper end 320A) is wider (thicker) than the portion of the insulation sleeve 320 below the step part 320B (toward the lower end 320C).

Because the insulation sleeve 320 is porous and gas-permeable, the gas passage 317 is in communication with the hole part 315A2 when the upper end 320A is installed in the hole part 315A1.

Although the insulation sleeve 320 of the third embodiment is provided in the gas passage 317 formed in the heater plate 313, a cooling gas can flow between the gas passage part 317C and the hole part 315A2 because the insulation sleeve 320 is formed of a porous insulating member.

The upper end 320A is inserted into the hole part 315A1 of the ceramic substrate 315. The step part 320B is installed in the step part 313B1 of the heater plate 313. Further, the lower end 320C is positioned lower than the lower end 313x of the aluminum plate 313B and substantially at the same height as the silicone resin layer 12.

Hence, the electrostatic chuck 300 of the third embodiment is configured having the hole part 315A1 (counterbore) provided in the ceramic substrate 315 and the upper end 320A of the insulation sleeve 320 inserted into the hole part 315A1. Further, the insulation sleeve 320 is provided inside the gas passage 317 formed in the heater plate 313, and the lower end 3200 of the insulation sleeve 320 is positioned lower than the lower end 313x of the aluminum plate 313B.

In other words, the inner wall of the gas passage 317C in the heater plate 313 is covered by the insulation sleeve 320.

Accordingly, in a state where high frequency power is supplied from the high frequency power source 1000 (see FIG. 8) to the base plate 311, even if a cooling gas is supplied to a wafer placed on the ceramic substrate 315, abnormal discharge can be prevented from occurring inside the gas passage 317 by way of the insulation sleeve 320 and the hole part 315A2.

It is to be noted that "abnormal discharge" includes an abnormal discharge occurring at an area that is relatively near the wafer placed on the ceramic substrate 315 (e.g., the gas passage part 317C of the gas passage 317) and an abnormal discharge occurring at an area that is relatively far from the wafer placed on the ceramic substrate 315 (e.g., the gas passage parts 317A and 317B of the gas passage 317).

The former abnormal discharge occurs in an area that is easily affected by, for example potential and electric power of the plasma generated on the surface of the wafer whereas the latter abnormal discharge occurs in an area that is not easily affected by such plasma.

The electrostatic chuck 300 of the third embodiment can effectively prevent abnormal discharge from occurring in the area easily affected by plasma (i.e. former abnormal discharge). However, it is considered that the prevention of the former abnormal discharge can also result to the prevention of the latter abnormal discharge.

Accordingly, with the electrostatic chuck 300 of the third embodiment, in a state where high frequency power is supplied to the base plate 311, even if a cooling gas is supplied to the wafer placed on the ceramic substrate 315, abnormal discharge can be prevented from occurring inside the entire gas passage 317 by way of the insulation sleeve 320 and the hole part 315A2.

Although the insulation sleeve 320 is provided only in the gas passage part 317C according to the above-described third embodiment, the insulation sleeve 320 may also be provided in the gas passage parts 317A and 317B.

In a case of providing the insulation sleeve 320 to a portion of the gas passage 317 instead of providing the insulation sleeve 320 to the entire gas passage 317 as described in the third embodiment, abnormal discharge can be prevented more effectively by using a porous insulating member as the insulation sleeve 320 rather than using a tubular insulating member as the insulation sleeve 320.

However, similar to the first embodiment, the insulation sleeve 320 may be formed by using the tubular insulating member instead of the porous insulating member.

Next, a method for manufacturing the electrostatic chuck 300 according to the third embodiment of the present invention is described with reference to FIGS. 9A-9C.

Figure 9A:
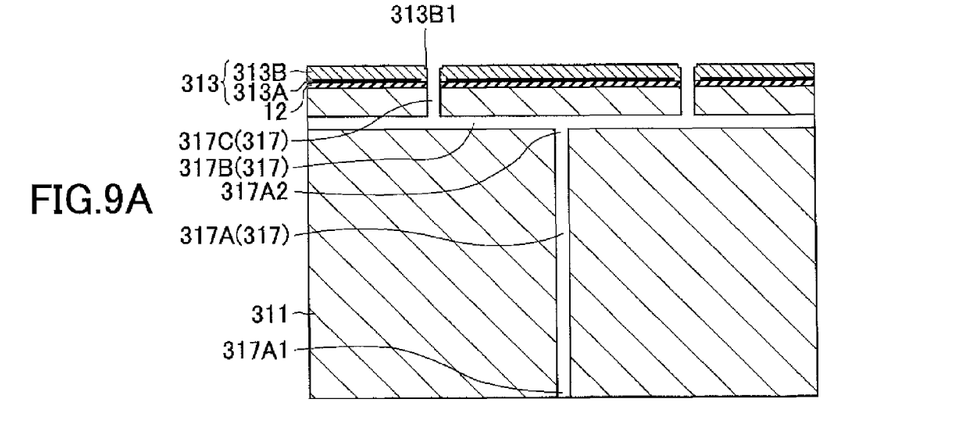
FIGS. 9A-9C are schematic diagrams illustrating a method for manufacturing an electrostatic chuck according to the third embodiment of the present invention.
Figure 9B:
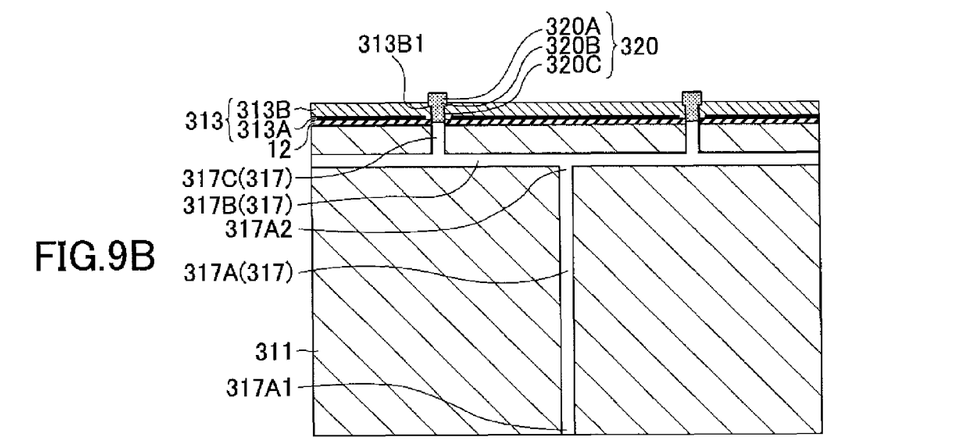
Figure 9C:
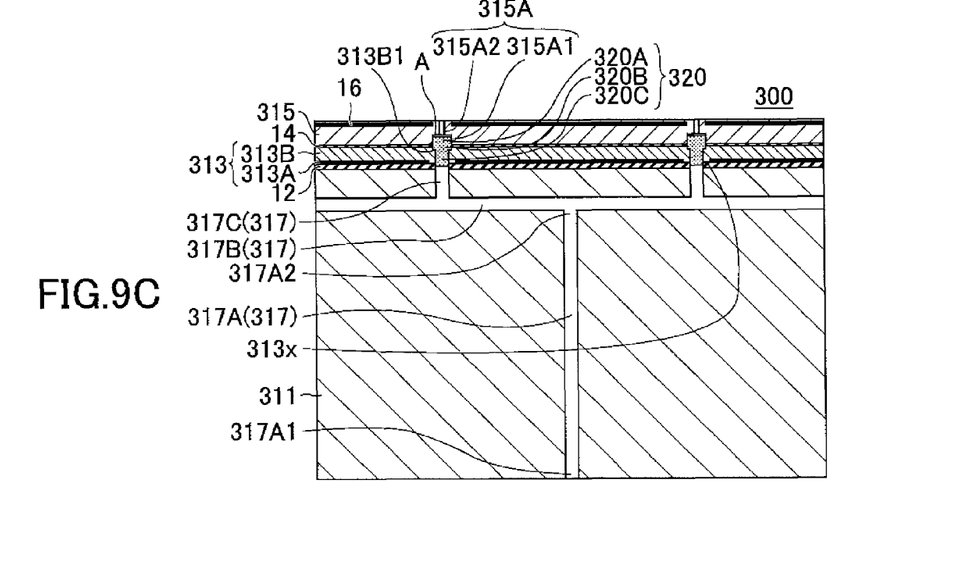

FIGS. 9A-9C are schematic diagrams illustrating a method for manufacturing the electrostatic chuck 300 according to the third embodiment of the present invention.

As illustrated in FIG. 9A, the base plate 311 and the heater plate 313 are adhered to each other by way of the silicone resin layer 12. The gas passage 317 is formed in each of the base plate 311 and the heater plate 313 beforehand.

Then, as illustrated in FIG. 9B, the insulation sleeve 320 is attached to the gas passage part 3170 of the aluminum plate 313B. For example, the insulation sleeve 320 may be adhered to the gas passage part 317C of the aluminum plate 313B by using an adhesive agent made of an epoxy resin. In attaching the insulation sleeve 320, the insulation sleeve 320 can be matched to a predetermined height with respect to the aluminum plate 313B by engaging the step part 320B of the insulation sleeve 320 with the step part 313B1 of the aluminum plate 313B.

Then, the silicone resin layer 14 is formed on the upper surface of the heater plate 313 of FIG. 9B by applying a silicone resin on the upper surface of the heater plate 313. Then, by adhering the upper surface of the heater plate 313 and the lower surface of the ceramic substrate 315 by way of the silicone resin layer 14, the manufacturing of the electrostatic chuck 300 is completed as illustrated in FIG. 9C. In adhering the heater plate 313 to the ceramic substrate 315, positioning may be performed, so that the upper end 320A of the insulation sleeve 320 is installed in the hole part 315A1 of the ceramic substrate 315. It is to be noted that an adhesive agent made of an epoxy resin may be applied between the upper end 320A and the hole part 315A1.

Accordingly, with the electrostatic chuck 300 of the third embodiment, in a state where high frequency power from the high frequency power source 1000 is supplied to the base plate 311, even if a cooling gas is supplied to the wafer placed on the ceramic substrate 315, abnormal discharge can be prevented from occurring inside the entire gas passage 317 by way of the insulation sleeve 320 and the hole part 315A2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An electrostatic chuck comprising:
a pedestal part formed of metal and electrically connected to a high frequency power source, the pedestal part including a gas passage;
an insulation substrate mounted on the pedestal part and including a first surface facing the pedestal part and a second surface on an opposite side of the first surface, the first surface including a first hole part communicating with the gas passage, the second surface including a second hole part having a bore diameter less than that of the first hole part and communicating with the first hole part; and
an insulation flow part formed of an insulating material and including a first end provided in the first hole part of the insulation substrate and a second end provided in the gas passage of the pedestal part electrically connected to the high frequency power source;
wherein the insulation flow part is configured to allow a gas supplied from the gas passage to flow into the second hole part,
wherein the insulation flow part is configured to insulate the gas passage of the pedestal part from a high frequency electric power that is applied from the high frequency power source to the pedestal part,
wherein the insulation flow part is configured to insulate a pathway extending to the second surface of the insulation substrate from the high frequency electric power of the pedestal part that is applied from the high frequency power source to the pedestal part, the pathway including the gas passage, the first hole part, and the second hole part, and
wherein a boundary between the first hole part and the second hole part has a step formed by a difference in the bore diameter, and the step faces, across an empty gap, a furthest end of the insulation flow part, the furthest end projecting further toward the second surface of the insulation substrate than any other part of the insulation flow part, an outer diameter of the furthest end of the insulation flow part being equal to a diameter of the empty gap across which the step faces the furthest end.

2. The electrostatic chuck as claimed in claim 1, wherein the gas passage includes an inlet into which the gas flows,
wherein the second end of the insulation flow part is positioned at the inlet of the gas passage.

3. The electrostatic chuck as claimed in claim 1, wherein the insulation flow part is formed of a tubular member.

4. The electrostatic chuck as claimed in claim 1, wherein the insulation flow part is formed of a porous columnar member.

5. The electrostatic chuck as claimed in claim 1, wherein the pathway is a coolant pathway extending to and supplying coolant gas to the second surface of the insulation substrate.

6. An electrostatic chuck comprising:
a pedestal part formed of metal and electrically connected to a high frequency power source, the pedestal part including a first gas passage;
a heater plate mounted on the pedestal part and including a second gas passage communicating with the first gas passage;
an insulation substrate mounted on the heater plate and including a first surface facing the heater plate and a second surface on an opposite side of the first surface, the first surface including a first hole part communicating with the second gas passage, the second surface including a second hole part having a bore diameter less than that of the first hole part and communicating with the first hole part; and
an insulation flow part formed of an insulating material and including a first end provided in the first hole part of the insulation substrate and a second end provided either in the first gas passage of the pedestal part electrically connected to the high frequency power source or in the second gas passage communicating with the first gas passage of the pedestal part electrically connected to the high frequency power source;
wherein the insulation flow part is configured to allow a gas supplied from the first gas passage to flow into the second hole part,
wherein the insulation flow part is configured to insulate at least the second gas passage of the heater plate from high frequency electric power that is applied from the high frequency power source to the pedestal part,
wherein the insulation flow part is configured to insulate a pathway extending to the second surface of the insulation substrate from high frequency electric power of the pedestal part that is applied from the high frequency power source to the pedestal part, the pathway including the first gas passage, the second gas passage, the first hole part, and the second hole part, and
wherein a boundary between the first hole part and the second hole part has a step formed by a difference in the bore diameter, and the step faces, across an empty gap, a furthest end of the insulation flow part, the furthest end projecting further toward the second surface of the insulation substrate than any other part of the insulation flow part, an outer diameter of the furthest end of the insulation flow part being equal to a diameter of the empty gap across which the step faces the furthest end.

7. The electrostatic chuck as claimed in claim 6, wherein the first gas passage includes an inlet into which the gas flows,
wherein the second end of the insulation flow part is positioned at the inlet of the first gas passage.

8. The electrostatic chuck as claimed in claim 6, wherein the insulation flow part is formed of a tubular member.

9. The electrostatic chuck as claimed in claim 6, wherein the insulation flow part is formed of a porous columnar member.

10. The electrostatic chuck as claimed in claim 6, wherein the pathway is a coolant pathway extending to and supplying coolant gas to the second surface of the insulation substrate.

* * * * *